US012679554B2

(12) United States Patent
Payo Gómez et al.

(10) Patent No.: US 12,679,554 B2
(45) Date of Patent: Jul. 14, 2026

(54) AERIAL REFUELLING DROGUE ASSEMBLY STABILIZATION AND GUIDANCE SYSTEM

(71) Applicant: Airbus Defence and Space, S.A.U., Getafe Madrid (ES)

(72) Inventors: Miguel Payo Gómez, Getafe Madrid (ES); Daniel Espinoza Vasquez, Getafe Madrid (ES)

(73) Assignee: AIRBUB DEFENCE AND SPACE, S.A.U., Getafe Madrid (ES)

( * ) Notice: Subject to any disclaimer, the term of this patent is extended or adjusted under 35 U.S.C. 154(b) by 0 days.

(21) Appl. No.: 19/241,618

(22) Filed: Jun. 18, 2025

(65) Prior Publication Data

US 2025/0388332 A1 Dec. 25, 2025

(30) Foreign Application Priority Data

Jun. 21, 2024 (EP) ..................................... 24382671

(51) Int. Cl.
 *B64D 39/00* (2006.01)
 *B64D 39/04* (2006.01)
(52) U.S. Cl.
 CPC ................................... *B64D 39/04* (2013.01)
(58) Field of Classification Search
 CPC ................................ B64D 39/04; B64D 39/00
 See application file for complete search history.

(56) References Cited

U.S. PATENT DOCUMENTS

| | | | |
|---|---|---|---|
| 8,186,623 B2 * | 5/2012 | Feldmann | B64D 39/06 244/135 A |
| 8,398,028 B1 | 3/2013 | Speer et al. | |
| 10,618,668 B2 * | 4/2020 | Pruzan | B64D 39/04 |
| 12,091,185 B2 * | 9/2024 | Dibb | B64D 39/00 |
| 2021/0300585 A1 | 9/2021 | Dibb et al. | |

FOREIGN PATENT DOCUMENTS

| | | | |
|---|---|---|---|
| CN | 114577431 B | 12/2022 | |
| ES | 2961957 T3 * | 3/2024 | B64D 39/00 |

OTHER PUBLICATIONS

Extended European Search Report from corresponding EP Application No. 24382671.6, Nov. 27, 2024.

* cited by examiner

*Primary Examiner* — Brian M O'Hara
(74) *Attorney, Agent, or Firm* — Workman Nydegger

(57) ABSTRACT

Air refuelling drogue assembly stabilization and guidance system having: a hollow body including an outer surface of aerodynamic shape with a nose cone; an inner surface located around a flexible hose annexed to a coupling such that the nose cone is located on the opposite side to the coupling; at least an aerofoil joined to the outer surface of the hollow body having a nose located on the opposite side to the coupling and being rotatable around an axis perpendicular to the longitudinal axis of the hollow body; and a control unit in connection with the aerofoil for its rotation to stabilize and guide the drogue.

15 Claims, 8 Drawing Sheets

AERIAL REFUELLING DROGUE ASSEMBLY STABILIZATION AND GUIDANCE SYSTEM

FIELD OF THE INVENTION

The present invention relates to the field of air-to-air refuelling. In particular, it is related to automatization for the hose-and-drogue system operations by providing the drogue with stabilization and guiding capabilities.

BACKGROUND OF THE INVENTION

Pod aerial refuelling system trailing components comprise a portion of a hose, followed by a coupling and a drogue located at the end of the coupling.

The probe-and-drogue refuelling method employs a flexible hose that trails from a tanker aircraft. The end of the hose comprises the mentioned coupling to be coupled to the receiver aircraft. The drogue is a fitting that stabilizes the hose coupling in flight and also provides a funnel coupling shape to aid insertion of a receiver aircraft probe into the hose coupling.

Pod aerial refuelling system trailing components are not actively stabilized. They depend on flow characteristics, and they adapt their movement and attitude to the flow. This makes its behavior highly dependent on external factors which complicates maneuvers that receivers need to perform to make contact.

With respect to air-to-air refuelling drogue stabilization devices, some known devices in the state-of-the-art air-to-air refuelling for the hose-and-drogue system are still prototypes and they do not correspond to well-tested devices.

One of the known devices comprises the addition of fins around the coupling, forming 90° with each other. Each fin having a small control surface that produces a non-symmetrical force. Another possibility is to add two of these sets of fins, one in front of the coupling and another behind the coupling. Another known possibility is to add aerofoils near the drogue and to rotate them to produce and direct the forces. All of these devices suffer from the possibility of colliding with the fairing tunnel in the pod once the drogue is recovered towards the tanker aircraft that may damage the device.

The use of spoilers to produce a force differential has also been proposed. However, this approach produces detachment of the boundary layer, which could affect significantly to the behavior of the drogue if it interacts with this detached boundary layer.

Another known possible solution is to alter the shape of the canopy of the drogue. This design would be heavily dependent on the current upstream of the drogue, with very difficult design and control. Any error in the estimation of the behavior of the drogue when encountering flow perturbations could produce a collapse of the drogue canopy and unprescribed displacement of the drogue.

As a result of not having a well-tested device, current aerial refuelling operations are performed without any stabilization device for drogues, so their behavior are highly dependent on the airstream, and movements due to turbulence or aerodynamic interaction with receiver's probe and nose cannot be counterbalanced. As explained before, although there are some known devices focused on stabilizing the drogue, they do not fulfil the three following main aspects:

a. avoid degradation on drogue's performances.

b. minimization of required forces for acting the aerodynamic surfaces. Limited envelope for actuators and power supply complexities.

c. protection against impacts with receiver and air refuelling system rear fairing tunnel during rewind.

SUMMARY OF THE INVENTION

It is an object of the current invention an air refuelling drogue assembly stabilisation and guidance system. The hose-and-drogue refuelling assembly system in which the stabilization and guidance system is installed comprises a portion of a flexible hose having its end, a coupling in connection with the end of the flexible hose and a drogue in connection with the coupling. It is considered the end of the flexible hose and of the coupling, the extreme of the flexible hose or of the coupling furthest from the tanker aircraft and therefore proximate to the receiver aircraft. Mechanically connected is understood as mechanically linked together.

The stabilization and guidance system comprises:

a. a hollow body having a longitudinal axis configured to be located parallel to the longitudinal axis of the flexible hose, the hollow body comprising:

b. an outer surface of aerodynamic shape with a nose cone, c. an inner surface configured to be located around the portion of the flexible hose annexed to the coupling such that the nose cone is configured to be located on the opposite side to the coupling, d. at least an aerofoil joined to the outer surface of the hollow body, the aerofoil having a longitudinal axis movable in a plane parallel to the longitudinal axis of the hollow body, the aerofoil having a nose configured to be located on the opposite side to the coupling and the aerofoil being rotatable around an axis perpendicular to the longitudinal axis of the hollow body, and e. a control unit in connection with the aerofoil for its rotation to stabilize and guide the drogue.

It is understood that a nose cone is the conically or semi-spherically shaped section of an aerodynamic body designed to modulate oncoming airflow behaviors. The nose cone of the hollow body is located on the opposite side to where the coupling is situated.

This invention attempts to grant control forces on the drogue to diminish the effect of current perturbations, be that from gusty wind or by the bow effect of the receiver.

The invention therefore comprises a hollow body that connects to the coupling and is located just before said coupling. Outside of the hollow body, at least an aerofoil will provide the lift and lateral force needed to displace the drogue. It is understood by an aerofoil any structure designed to manipulate the flow of a fluid to produce a reaction. An aerofoil is a streamlined body. In this case the nose of the aerofoil would be the leading edge of the aerofoil, i.e., the point having maximum curvature.

According to the above, to produce these forces, the invention uses the mentioned at least one aerofoil, rotating it as needed to produce the desired forces. The aerofoil or aerofoils are located such that its longitudinal axis, which runs from the nose to the tail, is movable in a plane parallel to the longitudinal axis of the hollow body and having the nose of the aerofoil on the same side as the nose cone of the hollow body.

Another advantage is that the system object of the invention is not implemented as a modification of an existing aerial refuelling coupling or drogue, but as an additional device for stabilization and guiding, which can be implemented without modifying existing aerial refuelling systems.

It is also an object of the invention an aerial refuelling drogue assembly, comprising a portion of a flexible hose comprising its end, a coupling in connection with the end of the flexible hose and a drogue in connection with the coupling comprises an air refuelling drogue assembly stabilization and guidance system according to the above.

It is also an object of the invention an aircraft comprising an aerial refuelling drogue assembly according to the above.

DESCRIPTION OF THE FIGURES

To complete the description and to provide for a better understanding of the invention, drawings are provided. Said drawings form an integral part of the description and illustrate preferred embodiments of the invention. The drawings comprise the following figures.

DETAILED DESCRIPTION OF THE INVENTION

Figure 1:
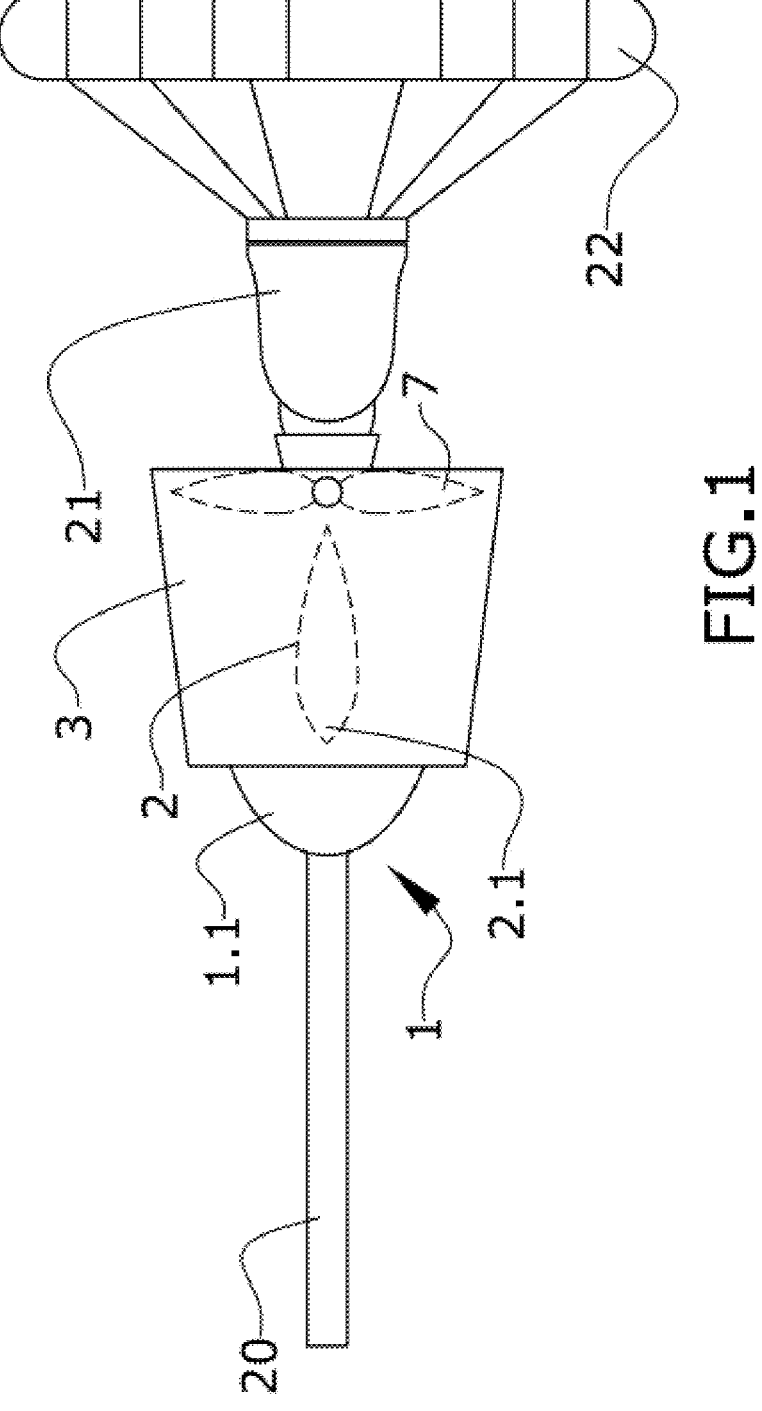
FIG. 1 shows a lateral view of a schematic representation of an aerial refuelling drogue assembly and an embodiment of an air refuelling stabilization and guiding system.

FIG. 1 shows a lateral view of a schematic representation of an aerial refuelling drogue assembly comprising a portion of a flexible hose (20), a coupling (21) located at the end of the flexible hose (20) and a drogue (22) located at the end of the coupling (21).

Figures 2, 3:
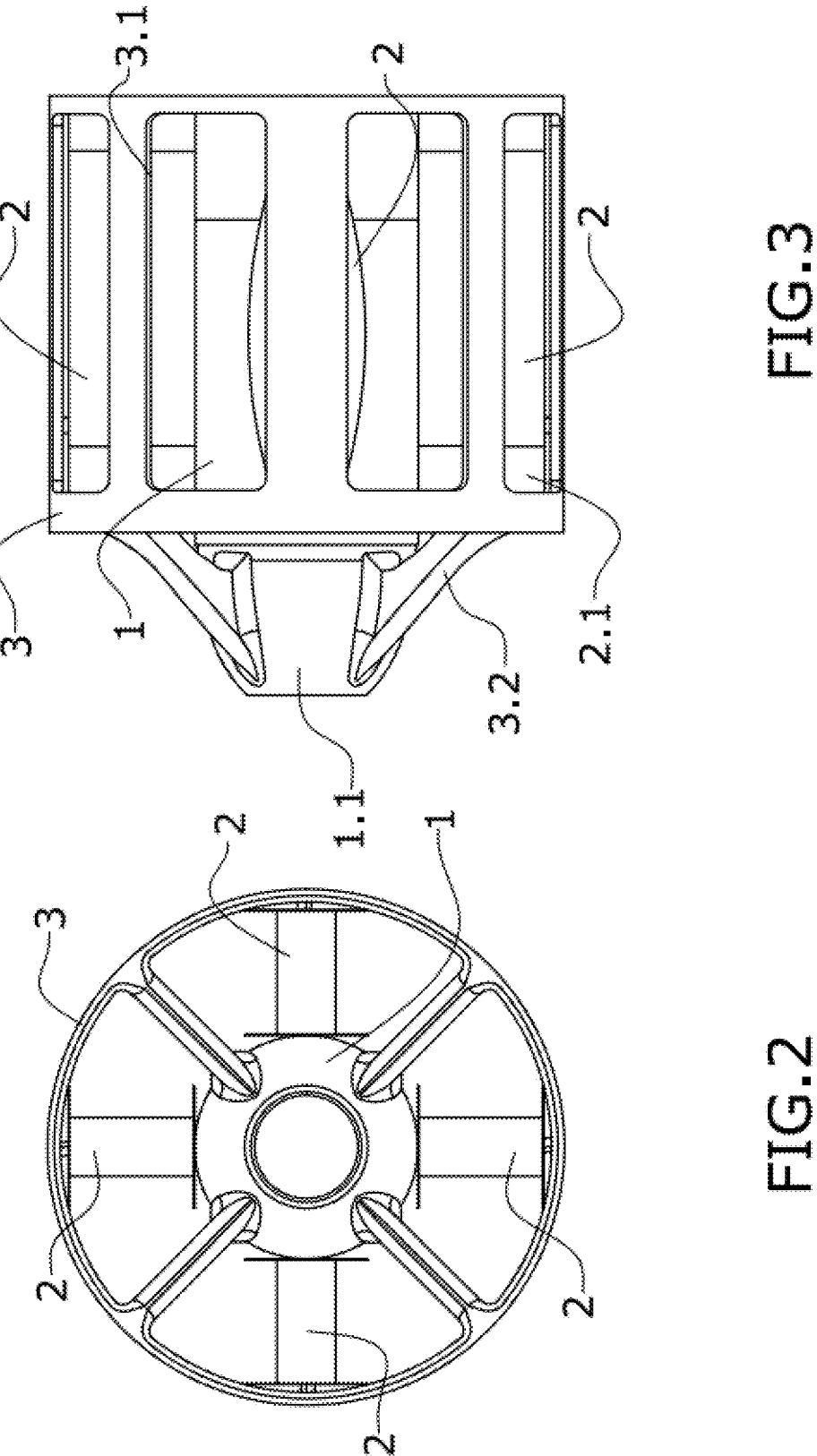
FIG. 2 shows a front view of an embodiment of the stabilization and guiding system.
FIG. 3 shows a lateral view of the embodiment of the stabilization and guiding system shown in FIG. 2.

FIGS. 1, 2 and 3 disclose an embodiment of an air refuelling stabilization and guiding system comprising:
  a. a hollow body (1) having a longitudinal axis configured to be located parallel to the longitudinal axis of the flexible hose (20), the hollow body (1) comprising:
  b. an outer surface of aerodynamic shape with a nose cone (1.1),
  c. an inner surface configured to be located around the portion of the flexible hose (20) annexed to the coupling (21) such that the nose cone (1.1) is configured to be located on the opposite side to the coupling (21),
  d. four aerofoils (2) joined to the outer surface of the hollow body (1). The aerofoils (2) have a longitudinal axis movable in a plane parallel to the longitudinal axis of the hollow body (1) and their nose (2.1) is located on the opposite side to the coupling (21). The aerofoils (2) are rotatable around an axis perpendicular to the longitudinal axis of the hollow body (1).
In an embodiment, the system comprises at least three aerofoils (2) located equally spaced apart around the hollow body (1). As said, the embodiments show four aerofoils (2) that are specifically located perpendicular to each other.

More specifically in the embodiment shown in the figures, the outer surface of the hollow body (1) comprises a bullet shape. As shown in FIG. 1, the air-to-air refuelling flexible hose (20) passes through the hollow body (1) so the interface between the flexible hose (20) and the coupling (21) is used as well to interface with the stabilization and guiding system.

In the embodiments shown in the figures, the aerofoils (2) are able to rotate around an axis that passes through its center of pressure. Aerofoils (2) are always facing the current and adjusting their angle to the airstream, feather position, in case no power is required. The rotation axis passing through the center of pressure minimizes the torque to be applied, so the power engines can be smaller.

As can be seen in FIG. 1 the aerofoil (2) comprises a symmetric profile. Aerofoils (2) are preferably symmetric profiles for actuation power minimization. Due to this, the angular position of the aerofoils (2), i.e., rotation of the device with respect to the flexible hose (20) axis, can be any, since it is not necessary to have aerofoils (2) in a specific position for being actuated and generate required forces.

In the embodiment shown in the figures the system further comprises an outer housing (3) that surrounds transversally, i.e., in a crosswise direction, the aerofoils (2) and also at least a longitudinal portion of the hollow body (1).

In the embodiments shown in the figures, the outer housing (3) has a truncated cone-shaped with its smallest base located on the side of the nose cone (1.1) of the hollow body (1). Alternatively, the outer housing (3) may have a cylindrical shape.

In the embodiments shown in FIGS. 3 to 8 the outer housing (3) comprises apertures (3.1) in its surface to minimize the tunnel effect.

The outer housing (3) comprises connector rods (3.2) to be joined to the hollow body (1).

Said outer housing (3) avoids damage of the aerofoils (2) and also directs the airflow towards the aerofoils (2). Thus, an advantage of the outer housing (3) is small actuation requirements to move the aerofoils (2) as well as low perturbance of drogue aerial refuelling.

Thus, to prevent impacting the aerofoils (2) when re-entering the tunnel of the pod, and thus risking damaging either the aerofoils (2) or any other element to which they are connected, the whole system is protected with the outer housing (3) which may be a thin hollowed truncated cone, that may have some apertures (3.1) to minimize tunnel effect. This structure joins the bullet-shaped hollow body (1) via, for instance, four connector rods (3.2) located in the front in the embodiments shown. This allows to reduce the number of required actuators, since aerofoils (2) do not need to be folded and unfolded.

A recurrent problem with devices located at the end of a hose (20) is power supply. They are usually powered by batteries, with the consequent increase in weight and reduced spatial envelope.

FIG. 1 shows the system comprising a turbine (7) located within the outer housing (3). Specifically, in the shown embodiment, the turbine (7) is located in the rear part of the outer housing (3), considering the rear part the part closer to the coupling (21).

Figure 4:
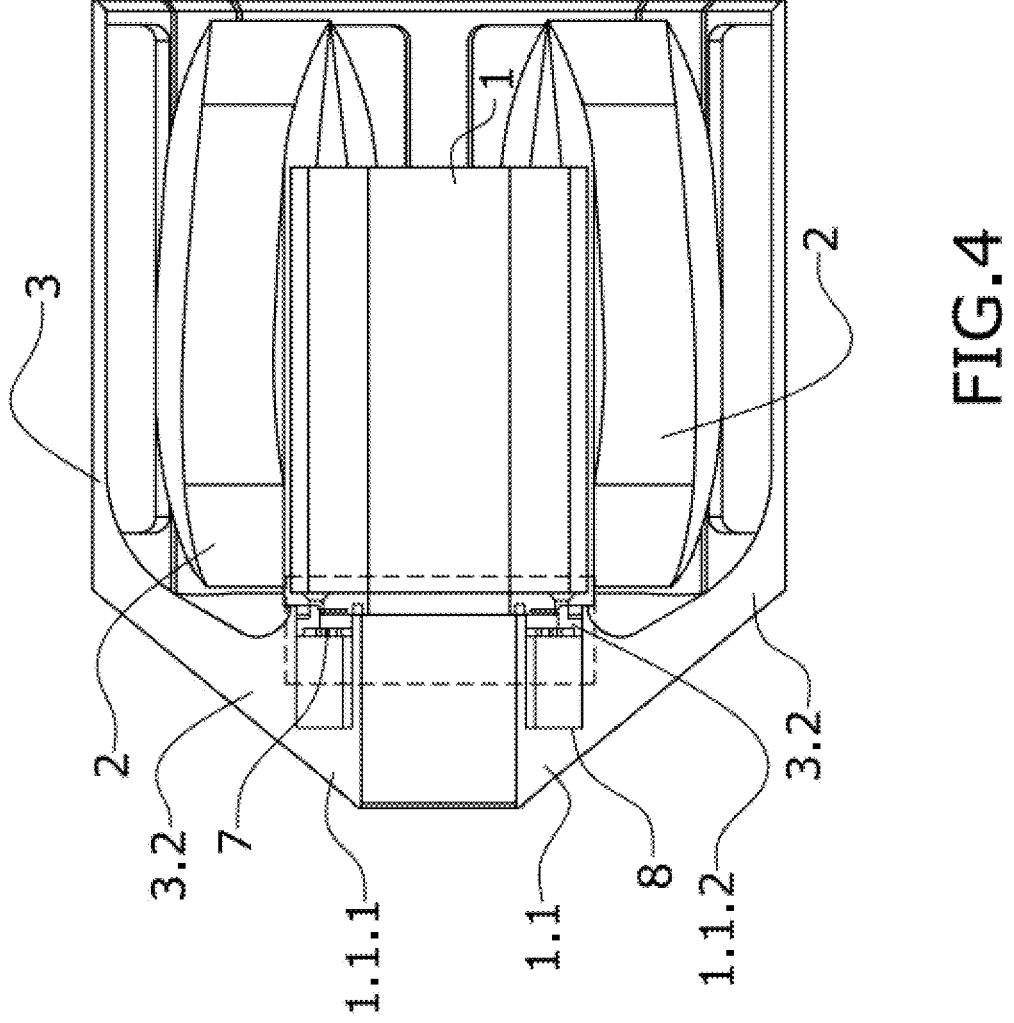
FIG. 4 shows a longitudinal cross-section of another embodiment of the stabilization and guiding system.
Figure 5:
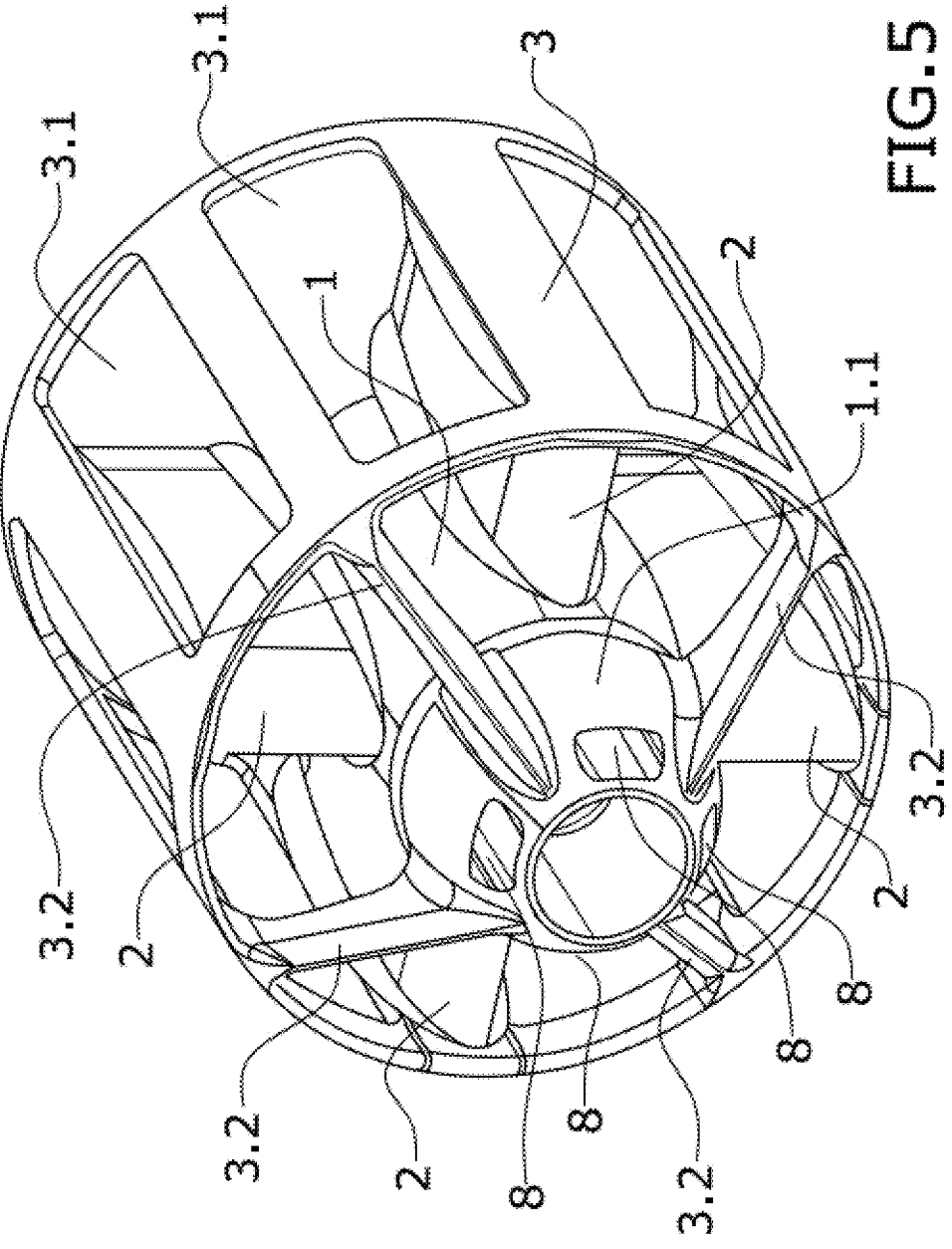
FIG. 5 shows a perspective view of the embodiment of the stabilization and guiding system shown in FIG. 4.
Figure 6:
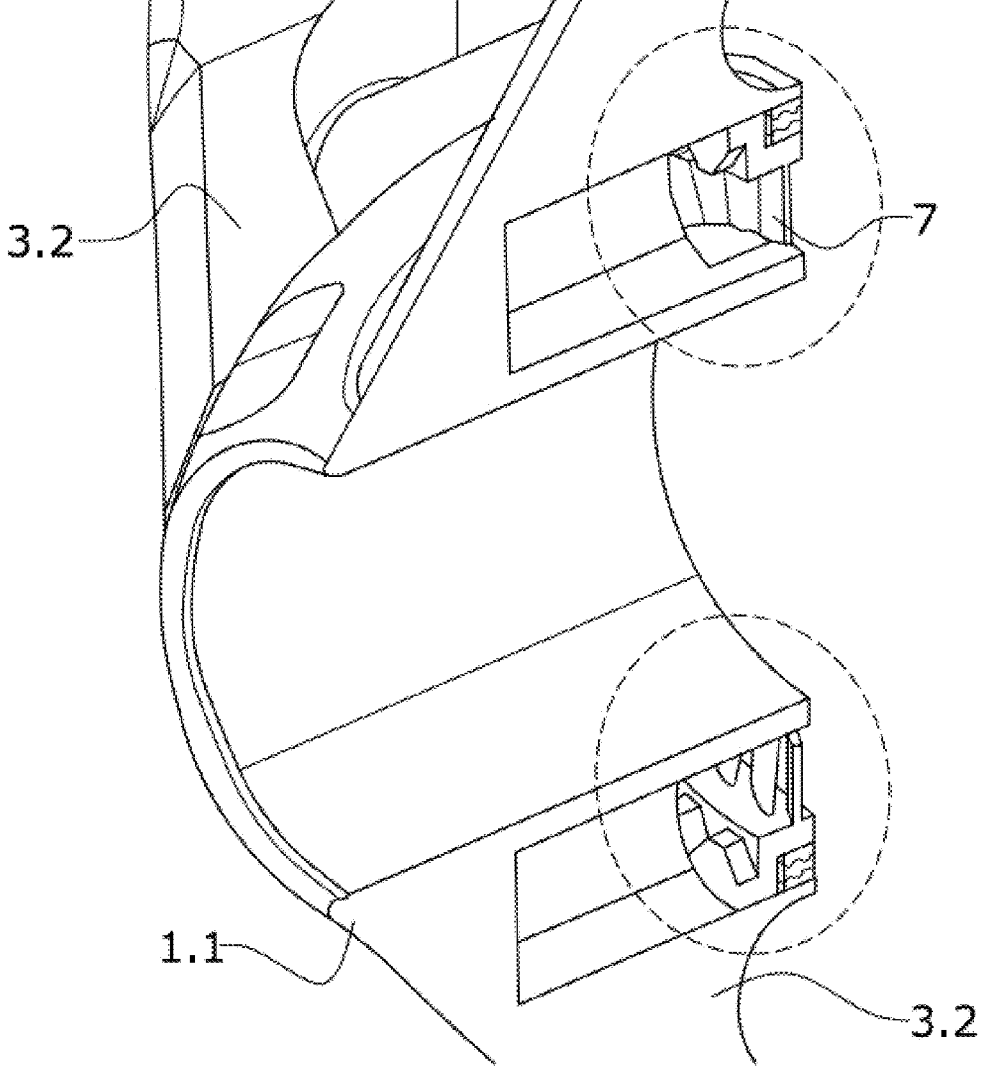
FIG. 6 shows a longitudinal cross-section of the nose cone of the hollow body of the embodiment shown in FIG. 4.

FIGS. 4 to 6 show an embodiment in which the turbine (7) is located in the hollow body (1). It is thus located within the outer housing (3), specifically under the connector rods (3.2).

In the shown embodiment, the turbine (7) is located in the nose cone (1.1), which comprises a tip (1.1.1), its pointed end, and a rear part (1.1.2), the turbine (7) being located in the rear part (1.1.2). In addition, the nose tip (1.1.1) comprises at least an opening (8) in fluid communication with the turbine (7) for the intake of fluid.

In the shown embodiment, the axis of rotation of the turbine (7) is the longitudinal axis of the hose (20) such that the turbine (7) is located around the hose (20).

The inclusion of a turbine (7) is an additional advantage of the invention, since, due to the geometry of the outer housing (3), it can be provided with a turbine (7) at the exit of the stabilization system in order to generate the required power to move the aerofoils (2) as well as power any other electronic equipment within the coupling or the drogue, such as drogue lights.

Figure 7:
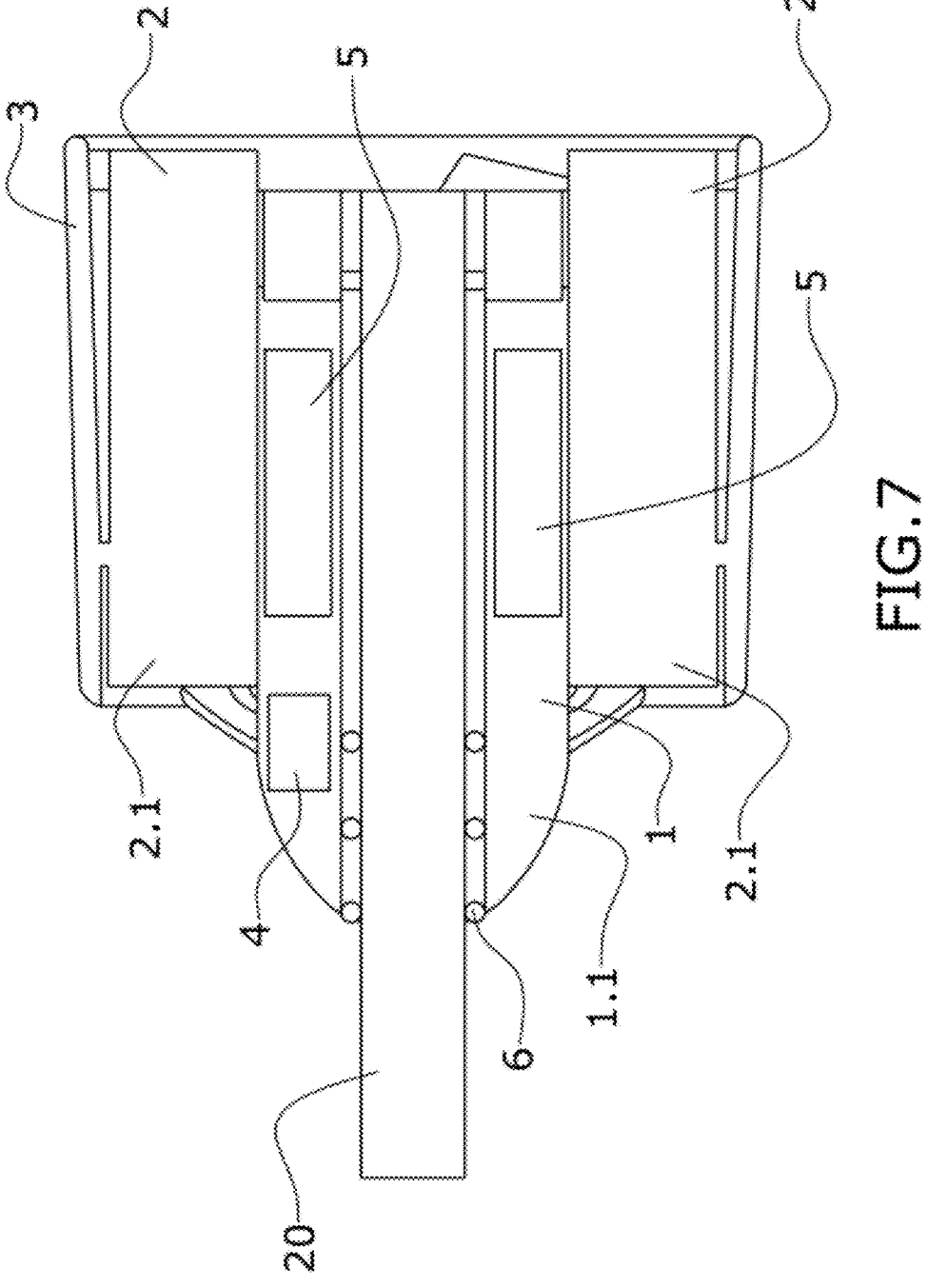
FIG. 7 shows a longitudinal cross-section of a schematic representation of another embodiment of an air refuelling stabilization and guiding system.
Figure 8:
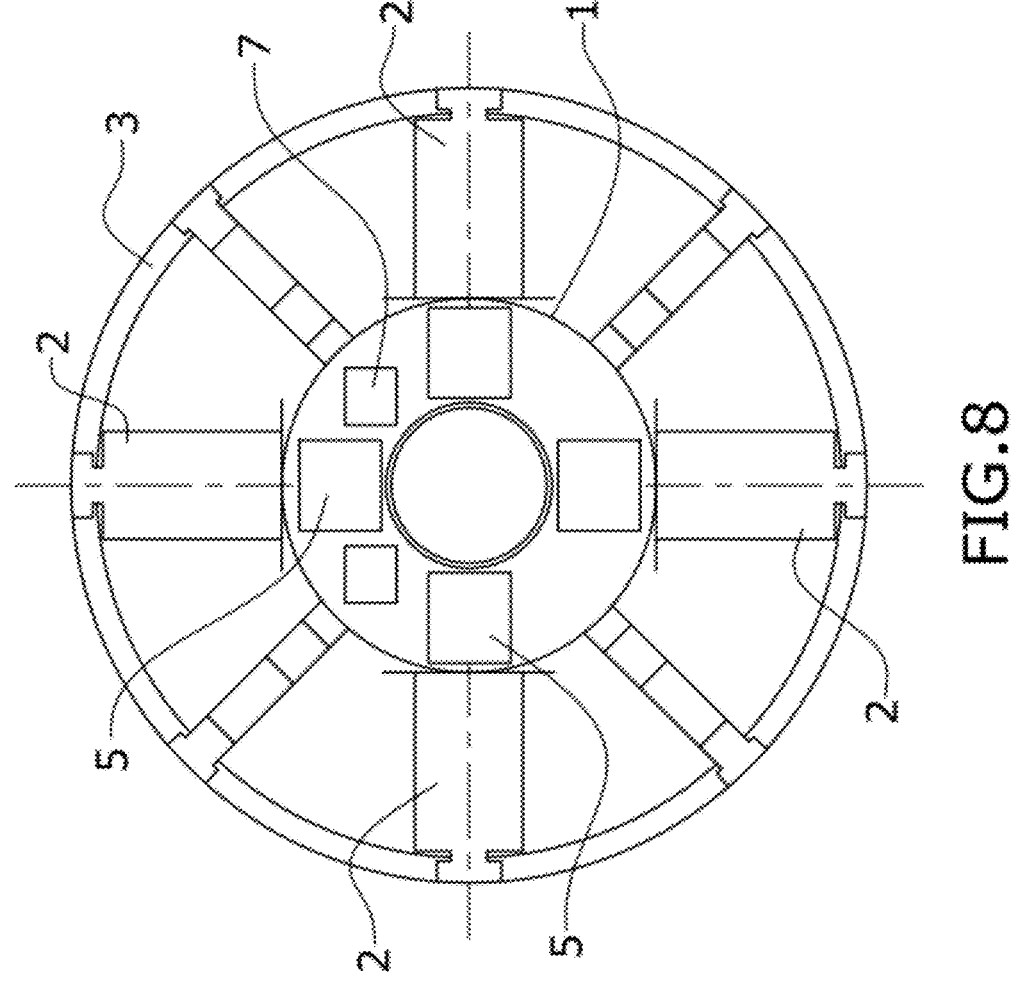
FIG. 8 shows a front view of the embodiment of the stabilization and guiding system shown in FIG. 7.
Figure 9:
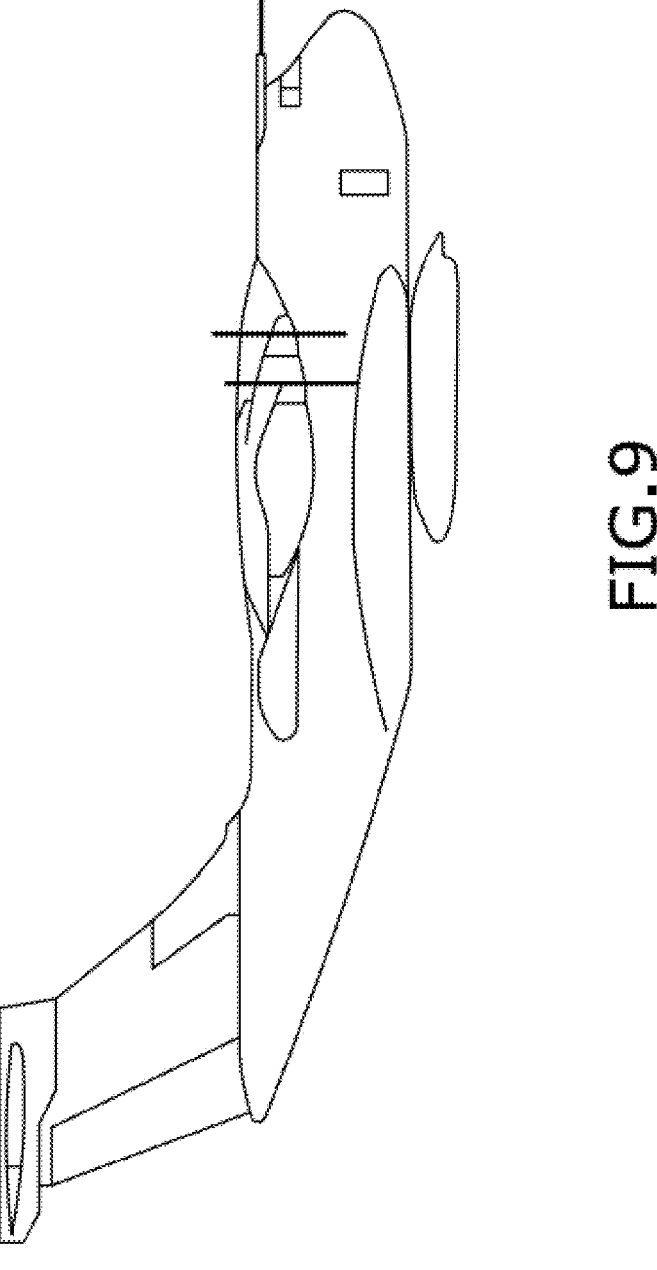
FIG. 9 shows an aircraft having the claimed system.

FIGS. 7 and 8 show that the system comprises actuators (5) so that the aerofoils (2) are actuated by an actuator (5). The actuator (5) is in connection with the control unit (4) for its movement.

Specifically, the system shown in the figures comprises four aerofoils (2), four actuators (5) and four gears, each gear in connection with one of the four aerofoils (2).

FIGS. 7 and 8 show that the actuators (5) are located in the hollow body (1) in the space between the outer surface and the inner surface.

According to the above, the aerofoils (2) are able to rotate around the axis that passes through their center of pressure via four actuators (5), one per aerofoil (2), located inside the hollow body (1).

FIG. 7 discloses that the air refueling drogue assembly comprises in an embodiment an elastic element (6) located surrounding the flexible hose (20). More specifically, the assembly comprises a buffer spring, in charge of pushing the drogue (22) into the airstream when stored in the rear fairing tunnel. In the shown embodiment the elastic element (6) is located within the inner surface of the hollow body (1). Specifically, the hollow body (1) comprises means for the attachment of the elastic element (6) so that the elastic element (6) is mounted within the hollow body (1). The elastic element (6) is large in diameter. Attaching it to the hollow body (1) allows the invention to take advantage of the space between the hose (20) and the hollow body (1), so the claimed system is more compact, reducing its interference with the drogue (22).

In addition, the system may be provided with load cells for load measuring as well as inertial measurement units, IMU (7), gyroscopes. It also may have inertial sensors.

It is also an object of the invention an aerial refuelling drogue, comprising a portion of a flexible hose (20) comprising its end, a coupling (21) in connection with the end of the flexible hose (20) and a drogue (22) in connection with the coupling (21). The assembly comprises an air refuelling drogue assembly stabilization and guidance system according to the above.

It is also an object of the invention an aircraft comprising an aerial refuelling drogue according to the above.

The invention claimed is:

1. An air refuelling drogue assembly stabilization and guidance system, the air refuelling drogue assembly comprising a portion of a flexible hose comprising its end, a coupling in connection with the end of the flexible hose and a drogue in connection with the coupling, the stabilization and guidance system comprising:
  a hollow body having a longitudinal axis configured to be located parallel to the longitudinal axis of the flexible hose, the hollow body comprising:

an outer surface of aerodynamic shape with a nose cone,
    an inner surface configured to be located around the portion of the flexible hose annexed to the coupling such that the nose cone is configured to be located on the opposite side to the coupling,
  at least an aerofoil joined to the outer surface of the hollow body, the aerofoil having a longitudinal axis movable in a plane parallel to the longitudinal axis of the hollow body, the aerofoil having a nose configured to be located on the opposite side to the coupling and the aerofoil being rotatable around an axis perpendicular to the longitudinal axis of the hollow body, and
  a control unit in connection with the aerofoil for its rotation to stabilize and guide the drogue.

2. The air refuelling drogue assembly stabilization and guidance system, according to claim 1, wherein it comprises an outer housing that surrounds transversally the at least one aerofoil and at least a longitudinal portion of the hollow body.

3. The air refuelling drogue assembly stabilization and guidance system, according to claim 2, wherein it comprises a turbine located within the outer housing.

4. The air refuelling drogue assembly stabilization and guidance system, according to claim 3, wherein the turbine is located in the hollow body.

5. The air refuelling drogue assembly stabilization and guidance system, according to claim 4, wherein the nose cone comprises a tip and a rear part, the turbine being located in the rear part.

6. The air refuelling drogue assembly stabilization and guidance system, according to claim 2, wherein the outer housing has cylindrical shape or a truncated cone shape with its smallest base located on the side of the nose cone of the hollow body.

7. The air refuelling drogue assembly stabilization and guidance system, according to claim 2, wherein the outer housing comprises apertures in its surface to minimize the tunnel effect.

8. The air refuelling drogue assembly stabilization and guidance system, according to claim 2, wherein the at least one aerofoil is rotatable around an axis that passes through its center of pressure.

9. The air refuelling drogue assembly stabilization and guidance system, according to claim 2, wherein it comprises at least three aerofoils located equally spaced apart around the hollow body.

10. The air refuelling drogue assembly stabilization and guidance system, according to claim 2, wherein it comprises an actuator to actuate the at least one aerofoil, the actuator configured to be in connection with the control unit for its movement.

11. The air refuelling drogue assembly stabilization and guidance system, according to claim 9, wherein it comprises four aerofoils, four actuators and four gears, each gear in connection with one of the four aerofoils.

12. The air refuelling drogue assembly stabilization and guidance system, according to claim 11, wherein the actuators are located in the hollow body in the space between the outer surface and the inner surface.

13. The air refuelling drogue assembly stabilization and guidance system, according to claim 1, wherein the assembly further comprises an elastic element located surrounding the flexible hose, the hollow body comprising means for the attachment of the elastic element.

14. The aerial refuelling drogue assembly, comprising a portion of a flexible hose comprising its end, a coupling in connection with the end of the flexible hose and a drogue in connection with the coupling, characterised in that it comprises an air refuelling drogue assembly stabilization and guidance system according to claim 1.

15. The aircraft, comprising an aerial refuelling drogue assembly according to claim 14.

\* \* \* \* \*